United States Patent
Moon et al.

(10) Patent No.: US 8,660,201 B2
(45) Date of Patent: Feb. 25, 2014

(54) APPARATUS FOR TRANSMITTING A SYNCHRONOUS SIGNAL IN A MULTI-ANTENNA SYSTEM

(75) Inventors: Sung Ho Moon, Anyang-si (KR); Min Seok Noh, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 13/001,403

(22) PCT Filed: Jun. 26, 2009

(86) PCT No.: PCT/KR2009/003488
§ 371 (c)(1),
(2), (4) Date: Dec. 23, 2010

(87) PCT Pub. No.: WO2010/002153
PCT Pub. Date: Jan. 7, 2010

(65) Prior Publication Data
US 2011/0103506 A1    May 5, 2011

Related U.S. Application Data

(60) Provisional application No. 61/077,146, filed on Jun. 30, 2008, provisional application No. 61/089,559, filed on Aug. 17, 2008.

(30) Foreign Application Priority Data

Mar. 2, 2009    (KR) .................. 10-2009-0017647

(51) Int. Cl.
*H04B 7/02* (2006.01)
*H04L 1/02* (2006.01)

(52) U.S. Cl.
USPC ...................... 375/267; 375/146; 375/299

(58) Field of Classification Search
USPC ........................................ 375/267, 259, 146
See application file for complete search history.

(56) References Cited

U.S. PATENT DOCUMENTS

| 7,961,696 | B2 * | 6/2011 | Ma et al. ................ 370/344 |
| 2004/0095904 | A1 * | 5/2004 | Laroia et al. ................ 370/329 |
| 2007/0097946 | A1 | 5/2007 | Mujtaba |
| 2008/0039107 | A1 * | 2/2008 | Ma et al. ................ 455/450 |
| 2008/0137769 | A1 | 6/2008 | Hwang et al. |
| 2009/0103593 | A1 * | 4/2009 | Bergamo ................ 375/146 |

* cited by examiner

*Primary Examiner* — Qutbuddin Ghulamali
(74) *Attorney, Agent, or Firm* — Lee, Hong, Degerman, Kang & Waimey

(57) ABSTRACT

An apparatus for transmitting a synchronization signal using a plurality of transmit (Tx) antennas is provided. The apparatus includes a synchronization signal generator for generating a synchronization signal used for tracking timing or frequency synchronization, a transmission processor for allocating different subcarriers to a plurality of Tx antennas without overlapping, mapping the synchronization signal to the subcarriers, and generating an orthogonal frequency division multiplexing (OFDM) symbol by performing inverse fast Fourier transformation (IFFT), a control signal coupler for controlling codes as a resource not to overlap among the plurality of Tx antennas, and the plurality of Tx antennas for transmitting the OFDM symbol.

6 Claims, 12 Drawing Sheets

APPARATUS FOR TRANSMITTING A SYNCHRONOUS SIGNAL IN A MULTI-ANTENNA SYSTEM

CROSS-REFERENCE TO RELATED APPLICATIONS

This application is the National Stage filing under 35 U.S.C. 371 of International Application No. PCT/KR2009/003488, filed on Jun. 26, 2009, which claims the benefit of earlier filing date and right of priority to Korean Application No. 10-2009-0017647, filed on Mar. 2, 2009, and also claims the benefit of U.S. Provisional Application Ser. Nos. 61/089,559, filed on Aug. 17, 2008, and 61/077,146, filed on Jun. 30, 2008, the contents of all of which are incorporated by reference herein in their entirety.

TECHNICAL FIELD

The present invention relates to wireless communications, and more particularly, to an apparatus for transmitting a synchronization signal in a multi-antenna system.

BACKGROUND ART

Recently, there has been an explosive increase in the demand for wireless data services. Further, an evolution from a wireless voice service to a wireless data service requires a gradual increase of wireless capacity. To cope with such a demand, wireless service providers and wireless equipment manufacturers attempt to improve a data rate of a wireless system, which results in motivating massive researches. A wireless channel experiences various problems such as path loss, shadowing, fading, noise, limited bandwidth, power limit of a user equipment (UE), and interference between other users. Due to these limitations, the wireless channel has a shape of a narrow pipe that obstructs fast data flow, and it is difficult to design an effective bandwidth of wireless communication providing high-speed data transmission. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission through a wireless channel. The use of the diversity can maximize data transfer capacity or data transfer reliability. A system for implementing the diversity by using multiple transmit (Tx) antennas and multiple receive (Rx) antennas is referred to as a multiple input multiple output (MIMO) system. The MIMO system is also referred to as a multiple antenna system.

Examples of the multi-antenna scheme include space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), generalized cyclic delay diversity (GCDD), selective virtual antenna permutation (S-VAP), etc. When the UE is initially synchronized to a base station (BS), the UE cannot know the number of Tx antennas of the BS. Therefore, the BS can use a transparent multi-antenna scheme (e.g., TSTD, PVS, CDD, etc) capable of receiving a synchronization signal even if the UE does not know the number of Tx antennas. However, according to the transparent multi-antenna scheme, the UE cannot estimate a channel for each Tx antenna of the BS, and thus it is difficult to effectively restore data. The FSTD is a scheme of distinguishing Tx antennas of the BS on a frequency basis in order to allow the UE to be able to estimate a wireless channel for each Tx antenna. In the FSTD, a frequency resource is allocated to each Tx antenna in a divided manner. There is a need for an apparatus and method for transmitting a synchronization signal capable of easily performing channel estimation for each Tx antenna when the synchronization signal is transmitted using a plurality of Tx antennas.

DISCLOSURE

Technical Problem

The present invention provides an apparatus for transmitting a synchronization signal in a multi-antenna system.

Technical Solution

According to an aspect of the present invention, an apparatus for transmitting a synchronization signal using a plurality of transmit (Tx) antennas is provided. The apparatus includes a synchronization signal generator for generating a synchronization signal used for tracking timing or frequency synchronization, a transmission processor for allocating different subcarriers to a plurality of Tx antennas without overlapping, mapping the synchronization signal to the subcarriers, and generating an orthogonal frequency division multiplexing (OFDM) symbol by performing inverse fast Fourier transformation (IFFT), a control signal coupler for controlling codes as a resource not to overlap among the plurality of Tx antennas, and the plurality of Tx antennas for transmitting the OFDM symbol. The codes are used to discriminate signals transmitted from the plurality of Tx antennas.

According to another aspect of the present invention, a method for transmitting a synchronization signal using a plurality of transmit (Tx) antennas is provided. The method includes generating a synchronization signal used for tracking timing or frequency synchronization, allocating different subcarriers to a plurality of Tx antennas without overlapping, dividing the subcarrier into a plurality of groups, and allocating codes used for transmission of the synchronization signal to each group without overlapping, mapping the synchronization signal to the subcarrier, and generating an orthogonal frequency division multiplexing (OFDM) symbol by performing inverse fast Fourier transformation (IFFT), and transmitting the OFDM symbol by using the plurality of Tx antennas.

Advantageous Effects

The present invention reduces an influence of channel interference of each antenna caused by transmission of a synchronization signal, and reduces overhead of various pieces of control information in a multi-antenna system.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16e (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16m for clarity of explanation, the technical features of the present invention are not limited thereto.

Figure 1:
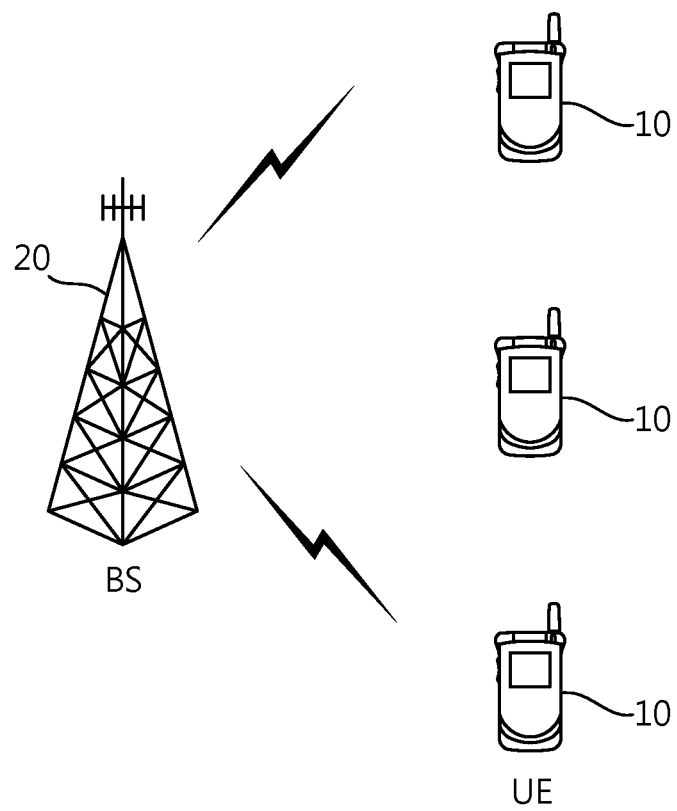
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (also referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

DL transmission and UL transmission may use different multiple access schemes. For example, DL transmission may use OFDMA, and UL transmission may use SC-FDMA or clustered discrete Fourier transform spread orthogonal frequency division multiplexing (DFT-S-OFDM). A typical SC-FDMA scheme implies that DFT-spread symbol streams are allocated (or mapped) to consecutive subcarriers or interleaved subcarriers. The clustered DFT-S-OFDM allocates (or maps) M(<N) symbol streams among N symbol streams which are DFT spread, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

Figure 2:
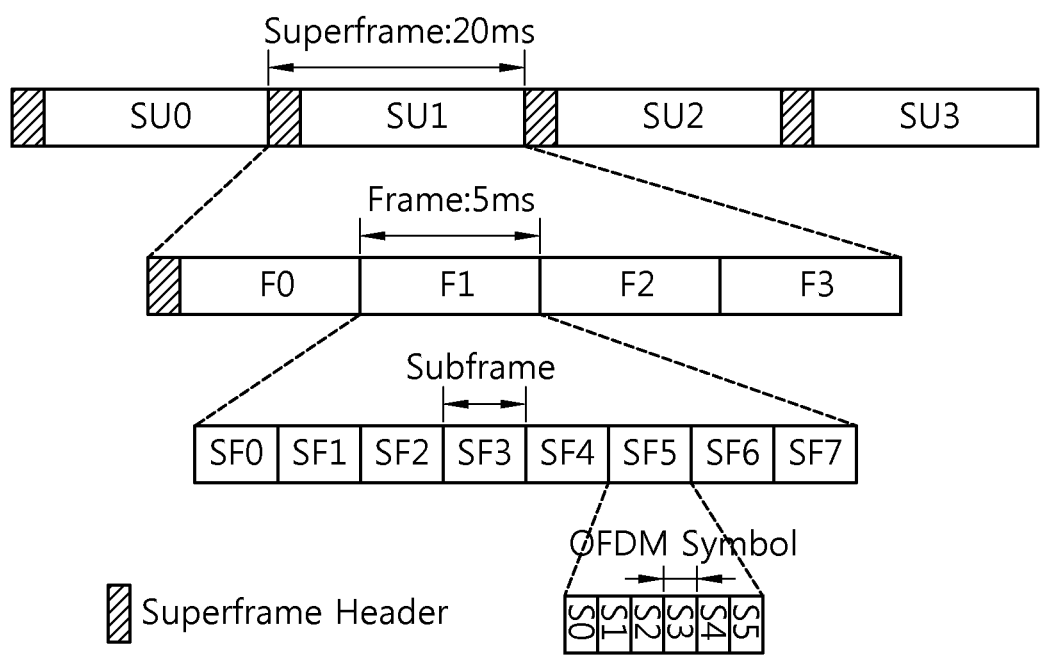
FIG. 2 shows an example of a frame structure.

FIG. 2 shows an example of a frame structure.

Referring to FIG. 2, a superframe includes a superframe header (SFH) and four frames F0, F1, F2, and F3. In case of using the superframe, a transmission period of control information not necessarily transmitted frequently can be increased in a superframe unit, and thus transmission efficiency can be increased. In addition, data allocation and scheduling are allowed to be performed in a sub-frame unit when they are the most frequently performed, and thus there is an advantage in that a delay property of data transmission can be decreased when considering a retransmission mechanism. Although it is shown that each superframe has a size of 20 milliseconds (ms) and each frame has a size of 5 ms, the present invention is not limited thereto. The frame can be considered in a variable size for compatibility with heterogeneous or legacy wireless communication systems.

The SFH may be located at a front-most position of the superframe. A common control channel is assigned to the SFH. The common control channel is used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 OFDM symbols, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission occupy different frequency bands and can be simultaneously performed.

A subframe includes at least one frequency partition. The frequency partition consists of at least one physical resource unit (PRU). The frequency partition may include a localized PRU and/or a distributed PRU. The frequency partition may be used for other purposes such as a fractional frequency reuse (FFR) or a multicast or broadcast service (MBS).

The PRU is defined as a basic physical unit for allocating resources including a plurality of consecutive OFDM symbols and a plurality of consecutive subcarriers. The number of OFDM symbols included in the PRU may be equal to the number of OFDM symbols included in one subframe. For example, when one subframe consists of 6 OFDM symbols, the PRU may be defined with 18 subcarriers and 6 OFDM symbols. A logical resource unit (LRU) is a basic logical unit for distributed resource allocation and localized resource allocation. The LRU is defined with a plurality of OFDM symbols and a plurality of subcarriers, and includes pilots used in the PRU. Therefore, one LRU includes a specific number of subcarriers, where the specific number depends on the number of allocated pilots.

A logical distributed resource unit (DRU) may be used to obtain a frequency diversity gain. The DRU includes a distributed subcarrier group in one frequency partition. The DRU has the same size as the PRU. One subcarrier is a basic unit for constituting the DRU.

A logical contiguous resource unit (CRU) may be used to obtain a frequency selective scheduling gain. The CRU includes a localized subcarrier group. The CRU has the same size as the PRU.

Figure 3:
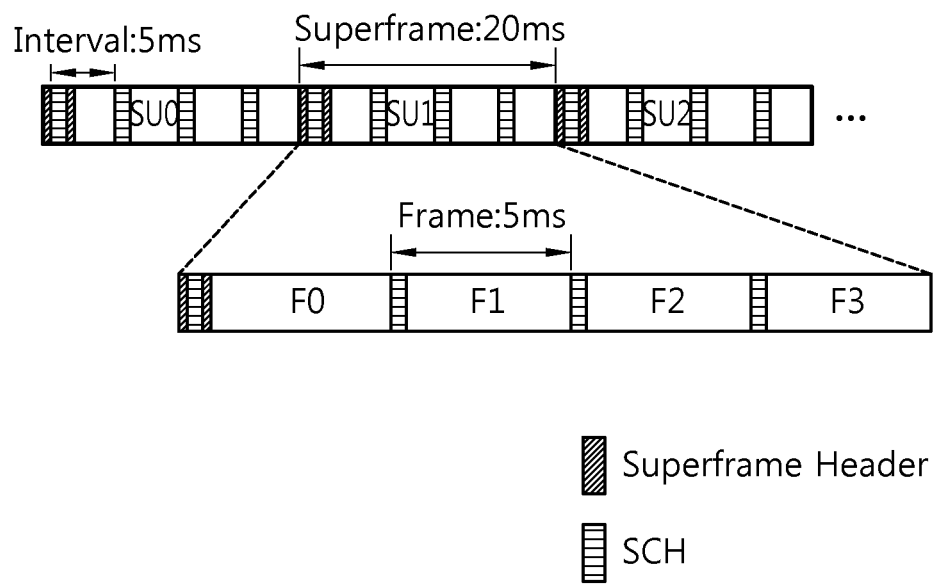
FIG. 3 shows an example of a synchronization channel (SCH) structure.

FIG. 3 shows an example of a synchronization channel (SCH) structure. A SCH collectively refers to all channels for performing timing or frequency synchronization by a UE with respect to a BS.

Referring to FIG. 3, the SCH can be arranged with a specific interval (e.g., 5 ms) in every superframe, and may also be arranged with a variable interval. The SCH may be included only in a frame having a superframe header, or may be included in a frame not having the superframe header. The former and latter cases are all applied to the superframe structure based on IEEE 802.16m.

The SCH includes one OFDM symbol. However, the SCH may additionally include an OFDM symbol not only for initial synchronization and cell information but also synchronization and cell information used in a handover process. Hereinafter, a signal transmitted on the SCH is referred to as a synchronization signal (SS). The SS may also be referred to as a preamble. In addition, the SS includes a primary synchronization signal (PSS) and a secondary synchronization signal (SSS). The PSS may be used by the UE to acquire synchronization of a subframe or an OFDM symbol. The SSS may be used by the UE to acquire synchronization of a superframe or a frame.

The SCH structure can be roughly classified into two types according to a method of acquiring initial timing/frequency synchronization. In a first type of method, initial timing/frequency synchronization is acquired by using a cross-correlation property. In the SCH structure based on this method, a synchronization signal is carried on all subcarriers in a frequency axis. If the synchronization signal is mapped only to an even-indexed subcarrier or an odd-indexed subcarrier, an ambiguous peak occurs when the UE performs cross-correlation, which makes it difficult to acquire the initial timing/frequency synchronization. The same is also true in general when the synchronization signal is transmitted by mapping it with a subcarrier spacing n (where n≥2).

In a second type of method, the initial timing/frequency synchronization is acquired by using an auto-correlation property. In order to use this method, the synchronization signal has to be transmitted in a repetitive pattern in a time axis. As one of methods capable of representing the synchronization signal in the repetitive pattern in the time axis, there is a method of mapping the synchronization signal with a subcarrier spacing n (where n≥2) in the frequency axis.

The following table shows comparison between pros and cons of an SCH structure based on the cross-correlation and an SCH structure based on the auto-correlation.

TABLE 1

| SCH structure | Pros | Cons |
|---|---|---|
| SCH structure based on cross-correlation | It can obtain a sharpened peak in timing acquisition under very small frequency offset environment. It means the coarse timing step can be skipped in the synchronization procedure | The complexity increases significantly. In order to achieve the fundamental goal, i.e, cell search, of the synchronization channel, it requires, at least, one additional channel either in time/frequency/code/space domain to carry cell ID information. Under a large frequency offset environment, the benefit of sharpened peak would disappear due to partial correlation. |
| SCH structure based on auto-correlation | The complexity is very small. It is possible for the synchronization channel to consist of only a single OFDM symbol. In other words, it does not require additional resources or channels. It can work well regardless of frequency offset effect due to differential operation. | Additional fine timing is required after cell ID detection. |

In conclusion, the SCH structure based on the auto-correlation is more preferred since it can decrease a computational amount of the UE and can avoid an influence caused by a frequency offset. A preamble of IEEE 802.16e also has the SCH structure for supporting a synchronization algorithm based on the auto-correlation in such a reason, and a transmission signal is carried with a subcarrier spacing of 3 in the frequency axis so that 3 repetitive patterns appear in the time axis. An SCH structure of IEEE 802.16m also requires a repetitive pattern in the time axis, and if compatibility with IEEE 802.16e is considered, requires a repetitive pattern that can avoid confusion with a preamble signal of IEEE 802.16e.

Hereinafter, a subcarrier allocation method will be described.

In general, a multi-carrier system may allocate a frequency resource according to two types, i.e., (1) a localized allocation type in which contiguous subcarriers are allocated in a full system bandwidth in a localized manner and (2) a distributed allocation type in which subcarriers are allocated in the full system bandwidth in a distributed manner. The distributed allocation type includes two types, i.e., a type in which the subcarriers are allocated in an interleaved manner and a type in which the subcarriers are allocated in a random manner.

Figure 4:
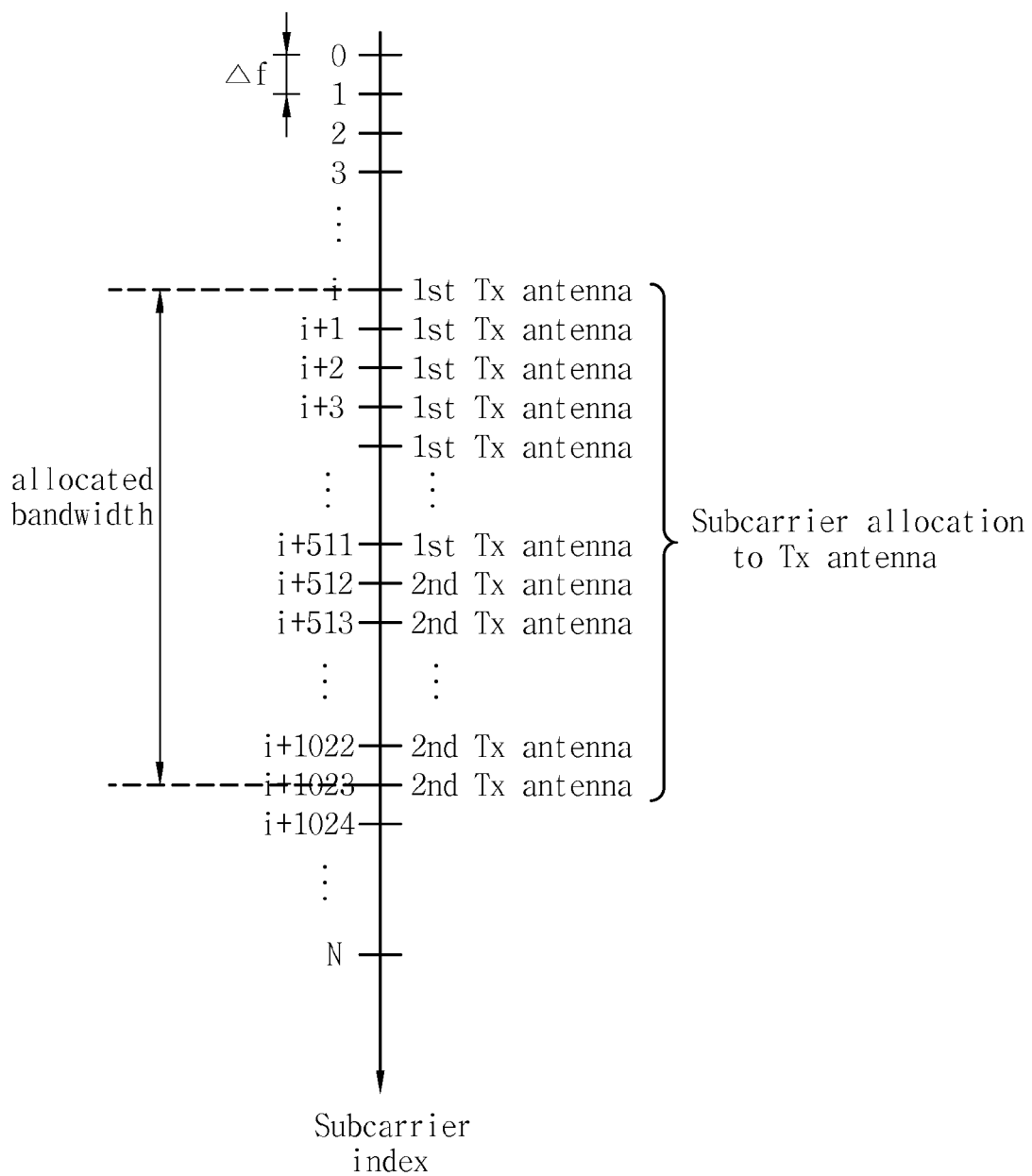
FIG. 4 shows an example of allocating a subcarrier to each Tx antenna in a localized manner in a system using FSTD.

FIG. 4 shows an example of allocating a subcarrier to each Tx antenna in a localized manner in a system using FSTD. It is assumed herein that a DFT size is 1024, and two Tx antennas are used.

Referring to FIG. 4, a bandwidth in which i-th to (i+1023)-th subcarriers are allocated in all system bands 0 to N is shown. $\Delta f$ denotes each subcarrier spacing. At any transmission time, different subcarriers are allocated to a $1^{st}$ Tx antenna and a $2^{nd}$ Tx antenna. This is because FSTD is used. In addition, subcarriers are allocated in a localized manner to each Tx antenna. For example, i-th to (i+511)-th subcarriers are allocated to the $1^{st}$ Tx antenna, and (i+512)-th to (i+1023)-th subcarriers are allocated to the $2^{nd}$ Tx antenna. That is, contiguous subcarriers in one region are allocated to one Tx antenna, and contiguous subcarriers in another region are allocated to another Tx antenna. This is called a localized type or a cluster type.

Figure 5:
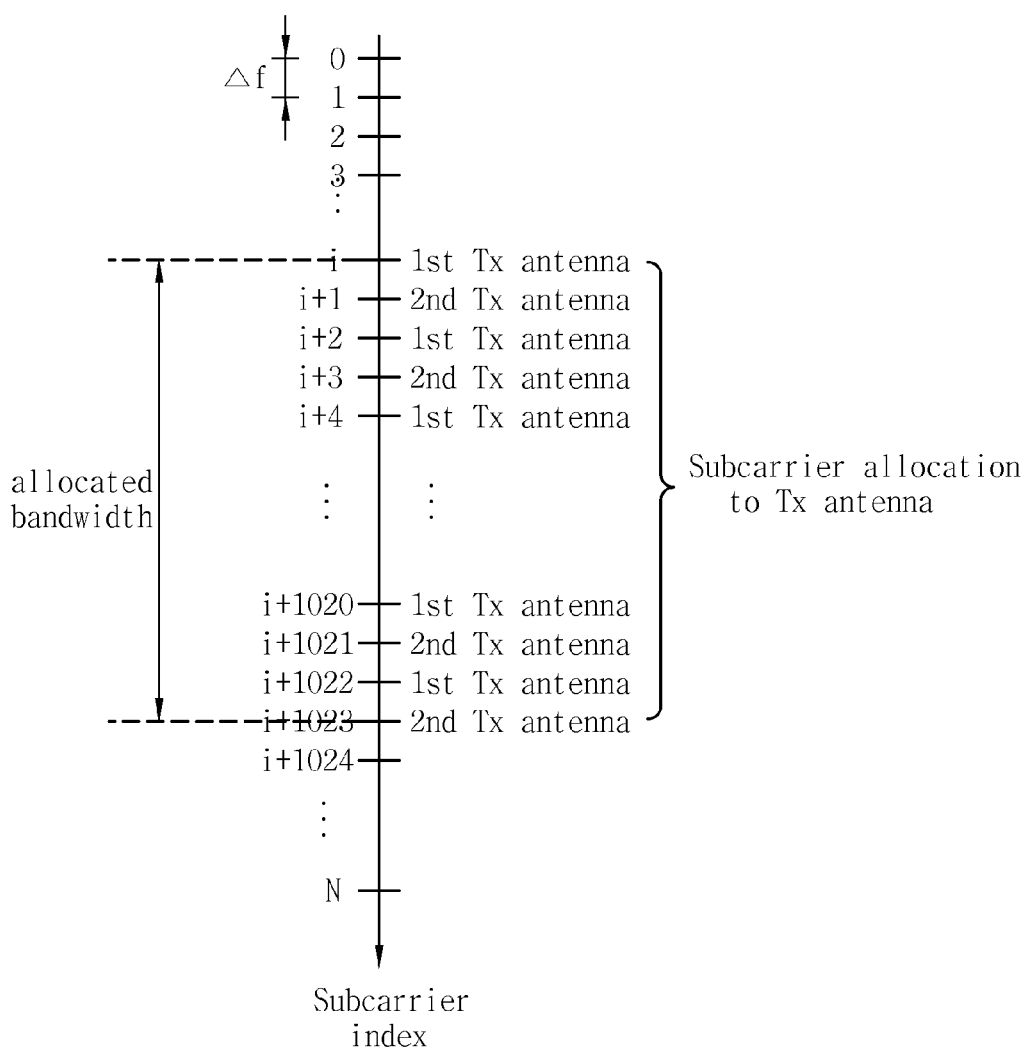
FIG. 5 shows an example of allocating subcarriers to each Tx antenna in a distributed manner in a system using FSTD.

FIG. 5 shows an example of allocating subcarriers to each Tx antenna in a distributed manner in a system using FSTD. It is assumed herein that a DFT size is 1024, and two Tx antennas are used.

Referring to FIG. 5, a bandwidth in which i-th to (i+1023)-th subcarriers are allocated in all system bands 0 to N is shown. At any transmission time, different subcarriers are allocated to a $1^{st}$ Tx antenna and a $2^{nd}$ Tx antenna. This is because FSTD is used. In addition, subcarriers are allocated in a distributed manner to each Tx antenna. For example, (i+2n)-th subcarriers are allocated to the $1^{st}$ Tx antenna, and (i+(2n+1))-th subcarriers are allocated to the $2^{nd}$ Tx antenna (where $0 \leq n \leq 511$). That is, one subcarrier is allocated to one Tx antenna, and next one subcarrier is allocated to another Tx antenna. This is a method of allocating subcarriers in an interleaved manner among the distributed allocation methods.

Meanwhile, a subcarrier allocation pattern may change to obtain a frequency diversity gain for each Tx antenna. For example, if a $1^{st}$ OFDM symbol is transmitted by allocating an even-indexed subcarrier to the $1^{st}$ Tx antenna and allocating an odd-indexed subcarrier to the $2^{nd}$ Tx antenna, when a $2^{nd}$ OFDM symbol is transmitted, the odd-indexed subcarrier is allocated to the $1^{st}$ Tx antenna and the even-indexed subcarrier is allocated to the $2^{nd}$ Tx antenna.

Figure 6:
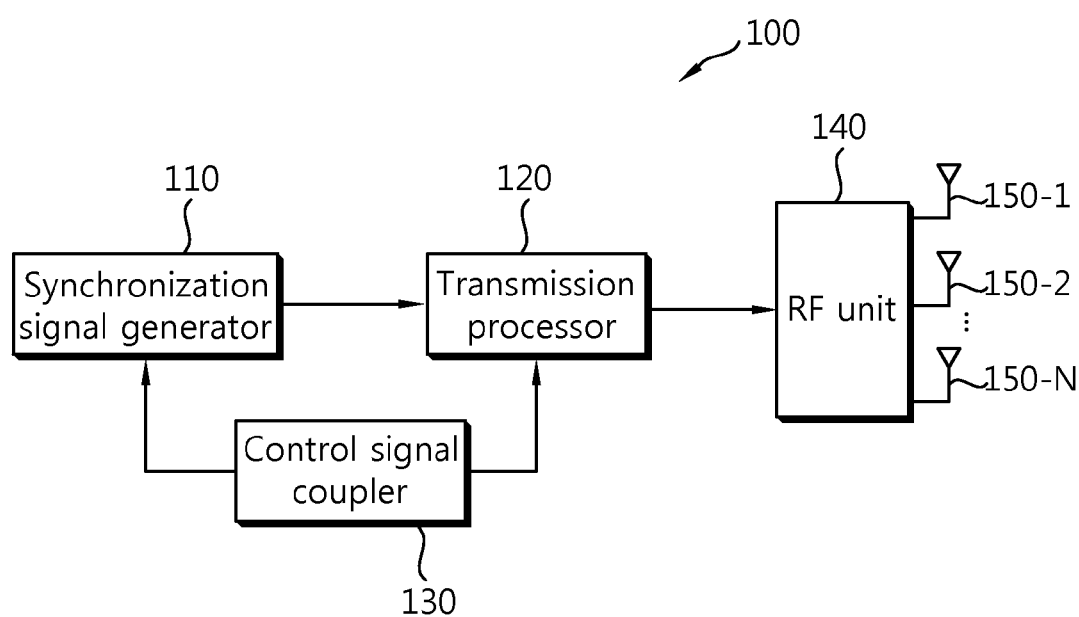
FIG. 6 is a diagram showing a transmitter according to an embodiment of the present invention.

FIG. 6 is a diagram showing a transmitter according to an embodiment of the present invention.

Referring to FIG. 6, a transmitter 100 includes a synchronization signal generator 110, an OFDM modulator (or a transmission processor) 120, a control signal coupler 130, a radio frequency (RF) unit 140, and Tx antennas 150-1, 150-2, . . . , 150-N.

The synchronization signal generator 110 generates a synchronization signal in a fixed or variable time interval by using a specific sequence or code. A method of generating the synchronization signal will be described below in detail. Herein, the sequence or code can be used in the same concept as a resource used to distinguish signals.

The transmission processor 120 maps the synchronization signal to subcarriers allocated to the respective Tx antennas 150-1, 150-2, . . . , 150-N by using FSTD, and generates an OFDM symbol by performing inverse fast Fourier transformation (IFFT). Different subcarriers are allocated to the respective Tx antennas 150-1, 150-2, . . . , 150-N. Further, different codes are used for the respective Tx antennas 150-1, 150-2, . . . , 150-N or for respective subcarriers. Control information such as the synchronization signal may be input to the transmission processor 120 by performing modulation independently from user data.

The control signal coupler 130 controls the synchronization signal generator 110 and the transmission processor 120, and couples additional control information to the synchronization signal. The additional control information is information that must be transmitted to a UE to effectively acquire initial synchronization. The additional control information includes frame boundary information, cyclic prefix (CP) information, the number of Tx antennas, frequency reuse factor (FRF) information, support information of heterogeneous or legacy wireless communication systems, frequency bandwidth information, femto/relay cell information, carrier ID information, etc. Detailed operations of the control signal coupler 130 will be described below.

The RF unit 140 converts an input OFDM symbol into an analog signal. The converted analog signal is propagated to a radio channel through the Tx antennas 150-1, 150-2, . . . , 150-N.

An amount of interference can decrease since the synchronization signal is transmitted by distinguishing the codes according to the respective Tx antennas. Further, resources can be effectively used since the additional control information does not have to be transmitted using a separate channel or resource with respect to the synchronization signal. Furthermore, the UE can acquire synchronization by using the synchronization signal and also can know control information in advance, and thus a delay time required to perform a necessary operation is significantly reduced.

Hereinafter, a method of generating a synchronization signal by using a plurality of Tx antennas in an FSTD mode will be described.

If a BS generates a synchronization signal by applying the same code for subcarriers of all Tx antennas, an amount of interference is as follows. For example, assume that a cell 1 uses a code x, and a cell 2 uses a code y. Then, the code x will be used in both a subcarrier allocated to a $1^{st}$ Tx antenna of the cell 1 and a subcarrier allocated to a $1^{st}$ Tx antenna of the cell 2. In addition, the code y will be used in both a subcarrier allocated to a $2^{nd}$ Tx antenna of the cell 1 and a subcarrier allocated to a $2^{nd}$ Tx antenna of the cell 2. In this case, an amount of interference having an effect on subcarriers is determined by cross-correlation of the code x and the code y with respect to the $1^{st}$ Tx antenna and the $2^{nd}$ Tx antenna. If the amount of interference is I(x,y), an amount of overall interference experienced by a UE is 2I(x,y) which is a sum of interference for all subcarriers (or all Tx antennas). As such, when the same code is used for all Tx antennas, the amount of interference is increased in proportion to the number k of cells, that is, k×I(x,y).

Figure 7:
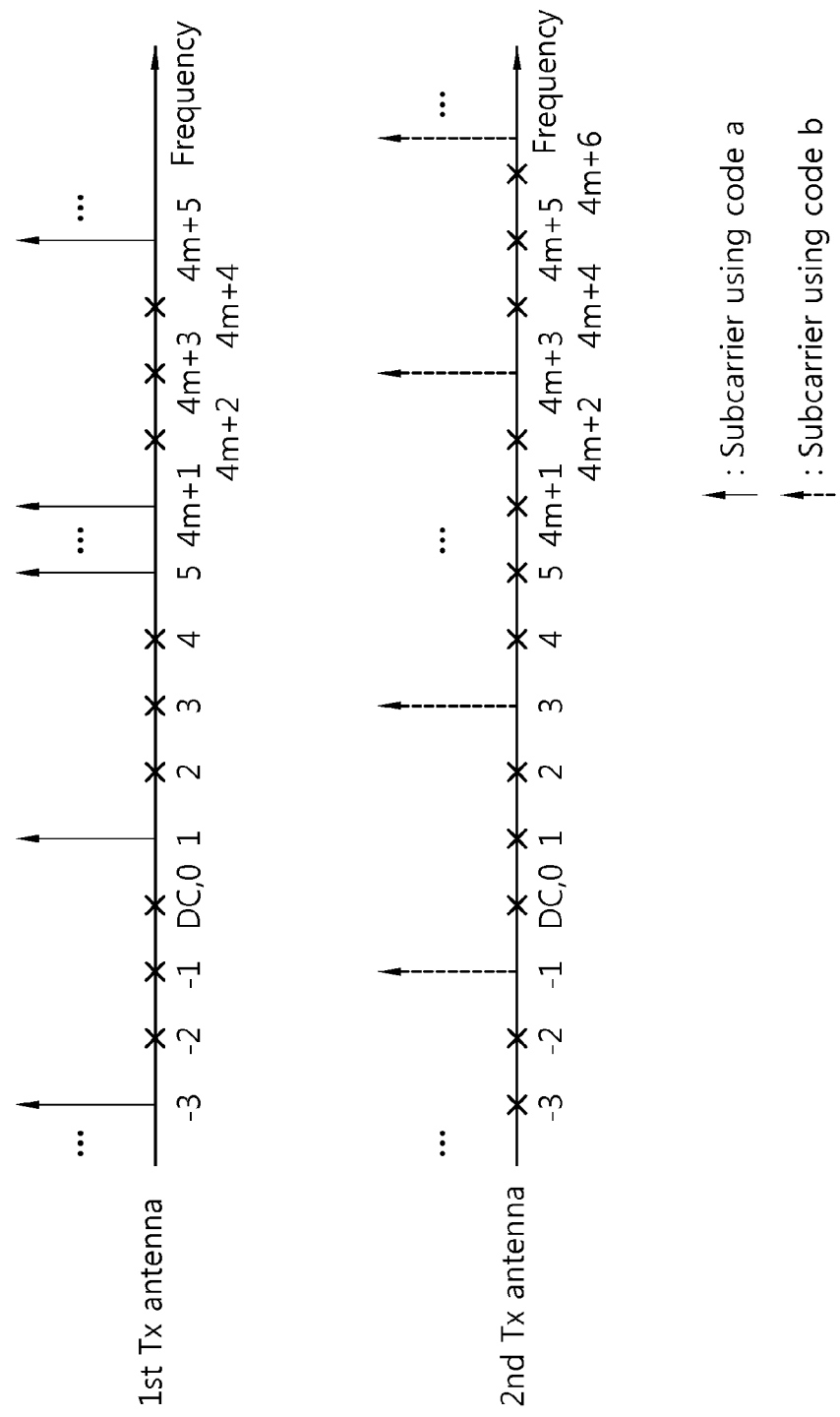
FIG. 7 is a diagram for explaining a method of generating a synchronization signal according to an embodiment of the present invention.

FIG. 7 is a diagram for explaining a method of generating a synchronization signal according to an embodiment of the present invention.

Referring to FIG. 7, to generate the synchronization signal, different subcarriers are allocated to a $1^{st}$ Tx antenna and a $2^{nd}$ Tx antenna according to FSTD. That is, a (4 m+1)-th subcarrier is allocated to the $1^{st}$ Tx antenna for the synchronization signal, and a (4m+3)-th subcarrier is allocated to the $2^{nd}$ Tx antenna for the synchronization signal (where m is an integer). Herein, a $0^{th}$ subcarrier is a DC carrier. In addition, a subcarrier of each antenna may use a different code. For example, when a code 'a' is used in a subcarrier allocated to the $1^{st}$ Tx antenna, a code 'b' is used in a subcarrier allocated to the $2^{nd}$ Tx antenna. Herein, the code 'a' is different from the code 'b', i.e., code a≠code b, and the code 'b' is obtained by circularly shifting the code 'a' in a time or frequency axis. The code may also be referred to as a sequence.

Each code may be determined by the following equation.

Code($k$)=0, where $k=4m$ or $k=4m+2$ and

Code($k$)=$A_j(m)$, where $k=4m+1$ and

Code($k$)=$B_j(m)$, where $k=4m+3$ [Equation 1]

In Equation 1, k denotes a subcarrier index, where $-N_{used} \leq k \leq N_{used}$, and $N_{used}$ denotes the number of subcarriers used in frequency bands at both sides of the DC subcarrier. Code(k) denotes a code applied to a k-th subcarrier. $A_j(m)$ denotes a j-th code in a code space A, and $B_j(m)$ denotes a j-th code in a code space B. The code space implies a set of codes applicable to a subcarrier. m is an integer, where $-N_{used}/4 \leq m \leq N_{used}/4$.

The code spaces A and B satisfy the following equation.

$B=F(\Delta t, A)$ or $B=F(\Delta f, A)$ [Equation 2]

In Equation 2, $F(\Delta t, A)$ denotes a function for circularly shifting the code space A in the time axis, and $F(\Delta f, A)$ denotes a function for circularly shifting the code space A in the frequency axis. For example, the code 'a' belonging to the code space A and the code 'b' belonging to the code space B may be related as $b=ae^{j\theta}$.

Equations 1 and 2 above are in association with a case of using 2 Tx antennas, but it is obvious that the same can also apply to a case of using any number of Tx antennas. In addition, the code (k) may be 0 when k=4 m+1 or k=4 m+3, unlike Equation 1 above. As such, when a different code is used in each Tx antenna, interference can be randomized.

Figure 8:
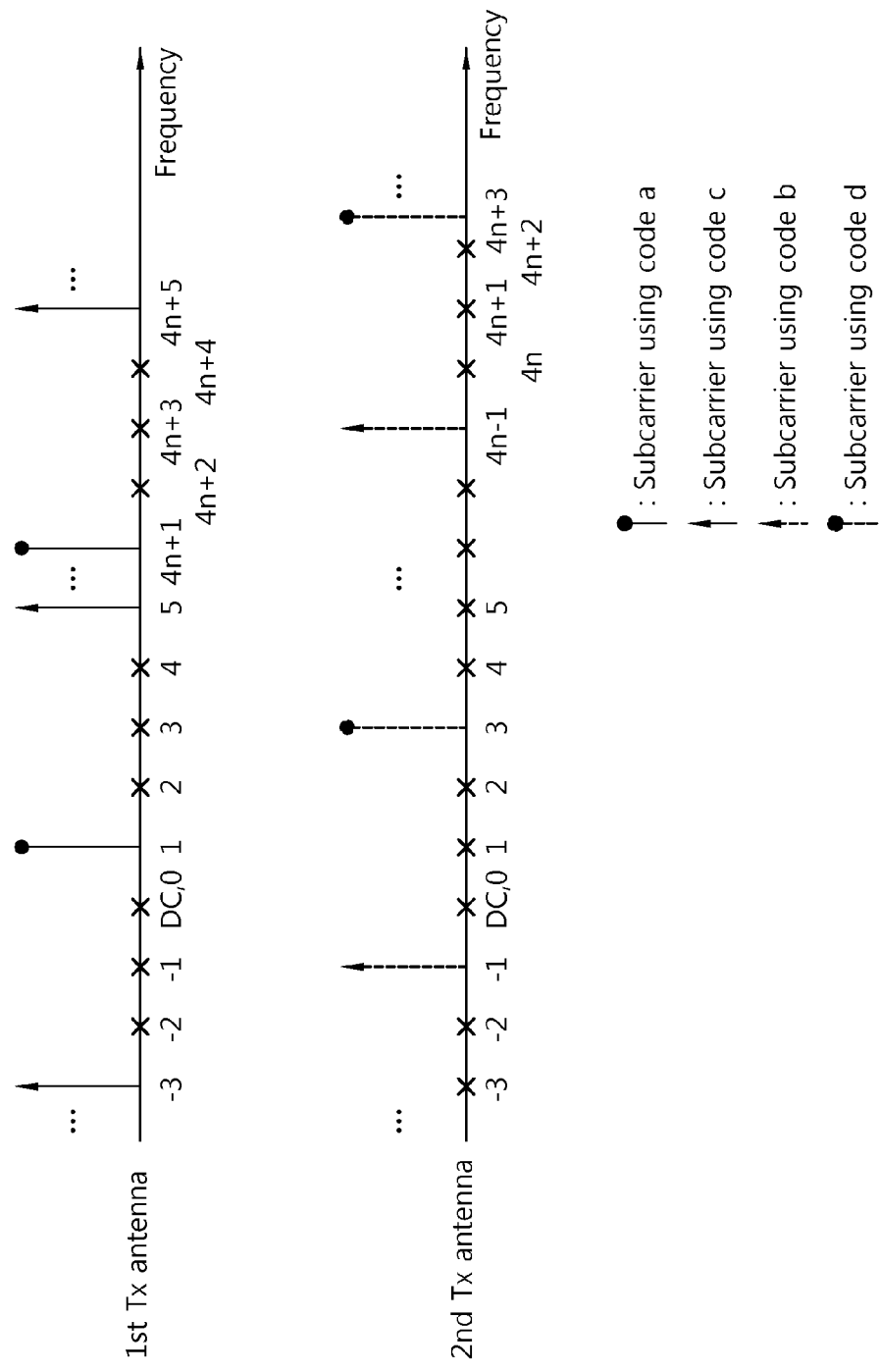
FIG. 8 is a diagram for explaining a method of generating a synchronization signal according to another embodiment of the present invention.

FIG. 8 is a diagram for explaining a method of generating a synchronization signal according to another embodiment of the present invention.

Referring to FIG. 8, the synchronization signal is generated by allocating different subcarriers to a $1^{st}$ Tx antenna and a $2^{nd}$ Tx antenna according to FSTD and by using different codes between the subcarriers. That is, a code 'a' and a code 'c' are used for the synchronization signal respectively in a (4n+1)-th subcarrier of the $1^{st}$ Tx antenna and a (4n+5)-th subcarrier of the $1^{st}$ Tx antenna (where n is an integer). Therefore, an amount of interference to a subcarrier allocated in the $1^{st}$ Tx antenna is I(a,c). Meanwhile, a code 'b' and a code 'd' are used for the synchronization signal respectively in a (4n−1)-th subcarrier of the $2^{nd}$ Tx antenna and a (4n+3)-th subcarrier of the $2^{nd}$ Tx antenna. An amount of interference to a subcarrier allocated in the $2^{nd}$ Tx antenna is I(b,d). A total amount of interference generated when the $1^{st}$ Tx antenna and the $2^{nd}$ Tx antenna transmit the synchronization signal is I(a,c)+I(b,d).

If a code used in each subcarrier differs when a different subcarrier is allocated to each cell, it may imply that a different code is used in each cell for the synchronization signal. For example, in the $1^{st}$ Tx antenna, if a subcarrier allocated to a cell 1 is the (4n+1)-th subcarrier and a subcarrier allocated to a cell 2 is the (4n+5)-th subcarrier, then the cell 1 uses the code 'a' and the cell 2 uses the code 'c'. Likewise, in the $2^{nd}$ Tx antenna, if the subcarrier allocated to the cell 1 is the (4n−1)-th subcarrier and a subcarrier allocated to the cell 2 is the (4n+3)-th subcarrier, the cell 1 uses the code 'b' and the cell 2 uses the code 'd'. In this case, a total amount of interference is I(a,c)+I(b,d), and there is an advantage in that interference is randomized instead of being increased in proportion to the number of cells. A method of generating a code applied to each subcarrier is determined by Equation 1 and Equation 2 above.

Hereinafter, additional control information coupled to a synchronization signal by the control signal coupler 130 will be described. In a method of obtaining initial system information through an SCH by decoding the additional control information has a problem in that a computation amount of a UE increases and also a time required to obtain the system information is delayed. Therefore, the control signal coupler 130 couples the control information to the synchronization signal in order to effectively obtain the initial system information. The additional system information has 8 types of information as follows.

1. Frame Boundary Information

In a structure of an IEEE 802.16m frame, not only a frame including a superframe header as shown in FIG. 3 but also a frame not including the superframe header can include an SCH. Therefore, the UE has to know information on a boundary of the superframe and the frame. The control signal coupler 130 couples information on the boundary of the superframe and the frame to the synchronization signal. A specific signature for initial system information transmission may be configured by inserting the signature differently in each frame or by inserting only a signature for distinguishing a frame including a superframe header or a start of a superframe from other frames.

2. CP Information

A wireless communication system uses various CPs according to an environmental, geographical effect. The CP is a period which is inserted to a time-domain guard interval on which IFFT is performed in an OFDM system, and is used to remove inter-symbol interference caused by multiple paths of a symbol. The CP may have various lengths according to a system or a service. In the process of initial system information acquisition, the UE cannot know a CP length used in a cell. Therefore, the control signal coupler 130 couples information on the CP length to the synchronization signal.

3. The Number of Tx Antennas

A recent wireless communication system considers multi-antenna transmission for transmission of a synchronization signal, control information, and data. The control signal coupler 130 couples information on the number of Tx antennas, which are used for transmission of the synchronization signal, to the synchronization signal.

4. Frequency Reuse Information

A cell-based wireless communication system uses a frequency reuse scheme to reduce mutual interference between neighbor cells. The frequency reuse allows the most adjacent cells to use different frequency resources. In general, a frequency resource factor 3 is used in which a full band is used by dividing it into three frequency resources. The control signal coupler 130 couples frequency reuse information to the synchronization signal. The frequency reuse information coupled to the synchronization signal can be defined as a sector ID. For example, when the sector ID is set to 3, information corresponding to the frequency reuse factor 3 can be one-to-one mapped to the sector ID. Alternatively, the sector ID can be used as frequency reuse information or additional cell information (e.g., an indicator of a femto cell or a relay cell) by setting the sector ID to any number.

5. Support Information of Heterogeneous or Legacy Systems

For example, the IEEE 802.16m system supports a legacy-support mode in which it coexists with the legacy IEEE 802.16e system by performing multiplexing according to time division multiplexing (TDM) or frequency division multiplexing (FDM). The control signal coupler 130 couples information, which indicates whether a cell is in a mode for supporting the legacy system (i.e., IEEE 802.16e and IEEE 802.16m coexist) or a mode for not supporting the legacy system (i.e., IEEE 802.16m-only-mode), to a synchronization signal. Alternatively, the control signal coupler 130 couples information, which indicates whether an operation of an IEEE 802.16m BS supports a UE of the legacy system or supports only a UE of the IEEE 802.16m system, to the synchronization information. Transmission of the synchronization signal in the IEEE 802.16m is utilized to distinguish an IEEE 802.16e BS from the IEEE 802.16m BS when a corresponding BS is the IEEE 802.16m BS not the legacy BS.

6. Information of Frequency Bandwidth

The wireless communication system may consider the support of a wider frequency band than a basic frequency band in use. For example, synchronization signals are searched variously according to bandwidth support capability of the UE in the IEEE 802.16m system, and this process requires acquisition of system bandwidth information by a specific UE. For example, if a UE capability is defined to a frequency bandwidth of 5, 10, and 20 MHz, a UE of 5 MHz can perform synchronization acquisition and cell ID detection through a 5 MHz SCH, and obtains system bandwidth information (e.g., 20 MHz system bandwidth) together. The control information combiner 130 combines information of a frequency band currently used in a cell to the synchronization signal.

7. Information on Femto Cell/Relay Cell

The wireless communication system can have the same feature as a femto cell or a relay cell, unlike a macro cell. The femto cell having a small cell size may be configured in an indoor environment to increase a transfer rate and to extend coverage, or such a form as the relay cell may be configured to support a shadow area generated by a geographical influence or an external environment. Therefore, the control signal coupler 130 couples information, which indicates a cell to which the UE intends to access, to the synchronization signal. Herein, a corresponding cell ID included in the synchronization signal may be recognized as a femto cell ID or a relay cell ID on the basis of indication information on the femto cell or the relay cell.

8. Carrier ID Information

The IEEE 802.16m system supports a multi-carrier environment capable of performing transmission or reception by utilizing a plurality of carriers defined with a specific bandwidth. The BS and the UE may be defined to be able to perform transmission/reception only with respective independent carriers, or may be configured to perform transmission/reception in a wide band configured using an aggregation of a plurality of carriers. Further, the respective carriers may be deployed continuously or non-continuously in a frequency domain. Furthermore, configuration of the aggregation may change statically or dynamically.

For example, it is assumed that there is a 100 MHz network which provides 5 carriers of a 20 MHz bandwidth. Carrier IDs 0, 1, 2, 3, and 4 are given to carriers managed by one network. The control signal coupler 130 couples carrier ID information to a synchronization signal. Assume that the synchronization signal exists in a specific master carrier and the UE detects the synchronization signal and transmits data by using a different slave carrier. The control signal coupler 130 may couple information for distinguishing the master/slave carriers to the synchronization signal, or may couple carrier ID information allocated to each carrier.

The UE recognizes a carrier ID in an initial synchronization acquisition process, and thus can access to a corresponding carrier without having to perform unnecessary handshaking with a network. Therefore, advantageously, network entry latency can be reduced.

Meanwhile, when a plurality of pieces of broadcast channel (BCH)/system information (SI) information are transmitted on a plurality of carriers to a control channel for transmitting system configuration information such as the BCH or SI, it causes deterioration of system capacity and band efficiency. Therefore, the system information is preferably transmitted through one or more specific carriers. In this case, when it is detected whether BCH/SI is transmitted in a process of attempting network entry by the UE through the synchronization signal, it causes deterioration of efficiency of network entry of the UE. Therefore, it is effective to detect existence of this information in a process of detecting the synchronization signal. The control signal coupler 130 couples carrier indication information for performing transmission of system information or broadcast information to the synchronization signal.

The BS may report to the UE whether the control channel exists simply by using 1-bit carrier indication information. The indication information may be transmitted only for a synchronization signal transmitted simultaneously with the BCH/SI. If the synchronization signal is more frequently transmitted than the BCH/SI, the indication information may be interpreted as information for indicating that this information is transmitted on a specific carrier. Meanwhile, information of multiple carriers (or a carrier/frequency spectrum aggregation) coupled to the synchronization signal may be used to report whether a certain carrier is a master carrier or a slave carrier, after the UE detects the synchronization signal.

Hereinafter, an operation of coupling additional control information to a synchronization signal by the control signal coupler 130 will be described. Herein, coupling of the additional control information to the synchronization signal implies that the synchronization signal is properly transformed and is then mapped to specific control information. That is, the control signal coupler 130 properly transforms and distinguishes the synchronization signal according to control information to be added. Meanwhile, the UE receives the synchronization signal generated in a particular transformation state in a time axis or a frequency axis, and maps the particular transformation state to the additional control information, and thus can know implicitly the added control information. For example, if a transformation state of the synchronization signal is R, additional control information r is indicated, and if the transmission state of the synchronization signal is T, additional control information t is indicated.

The control signal coupler 130 couples the additional control information to the synchronization signal by using one of three methods below. First, the additional control information is coupled by varying a circular shift size in the time axis or the frequency axis for code generation (i.e., a circular shift-based coupling method). Second, the additional control information is coupled by varying a mapping relation of a code per Tx antenna and an FSTD-based subcarrier group (i.e., a mapping relation-based coupling method). Third, the additional control information is coupled by mapping the synchronization signal to an odd or even subcarrier (i.e., a subcarrier index-based coupling method). The three methods will be described hereinafter in detail.

1. Circular Shift-Based Coupling Method

Assume that N Tx antennas transmit a synchronization signal by using a code C(n, s(n)). Herein, n(=1, 2, ..., N) denotes a Tx antenna index, and s(n) denotes a circular shift value applied to a code of an n-th Tx antenna. The circular shift value is a value shifted in a time axis or a frequency axis with respect to a $1^{st}$ Tx antenna. For example, a code C(2, s(2)) is a code applied to a $2^{nd}$ Tx antenna, and implies that it is circularly shifted by s(2) from the circular shift value of the code used in the $1^{st}$ Tx antenna.

Which control information is coupled to the synchronization signal can be distinguished according to the circular shift size of the code. A mapping table indicating a mapping relation between the circular shift size and the additional control information is used to distinguish the control information. The following table indicates the mapping relation between the circular shift size and the additional control information.

TABLE 2

| Shift vector S = [s(1), s(2), . . . , s(N)] | Control information coupled to synchronization signal |
|---|---|
| $S_1$ = [0, x1, x2, . . . , xN] | control information 1 |
| $S_2$ = [0, y1, y2, . . . , yN] | control information 2 |
| . . . | . . . |
| $S_M$ = [0, z1, z2, . . . , zN] | control information M |

When a set of circular shift sizes s(1), s(2), . . . , s(N) of a code used in each Tx antenna is defined to a vector, this is called a shift vector. That is, the shift vector S is [s(1), s(2), . . . , s(N)]. A specific shift vector S indicates specific control information coupled to the synchronization signal. For example, a shift vector $S_1$ may indicate control information 1, and a shift vector $S_2$ may indicate control information 2. Such as, the number M of independent shift vectors is directly used as the number of pieces of control information that can be coupled to the synchronization signal. There is no restriction on a method of creating the shift vector S as long as shift vectors mapped to the respective pieces of control information are set differently.

The control signal coupler 130 determines a shift vector $S_i$ (where 1≤i≤N) corresponding to control information i to be coupled to the synchronization signal, and controls the synchronization signal generator 110 to apply a code to each Tx antenna according to the shift vector.

The greater the number of defined shift vectors, the greater the number of hypothesis tests to be performed when the UE obtains information through the synchronization signal. Therefore, the number of defined shift vectors must be a minimum value exceeding the number of pieces of necessary control information. In addition, a cross-correlation difference is preferably set to its maximum so that not many errors occur in the distinguishing of the control information. Although a start circular shift size is set to "0" in all shift vectors and is used as a reference value in the process of synchronization acquisition in Table 2 above, this is for exemplary purposes only. Thus, the start circular shift size may be set to a different value, and a start circular shift size of each shift vector may also vary.

2. Mapping Relation-Based Coupling Method

Assume that N Tx antennas transmit a synchronization signal by using a code C(n, s(n)). Herein, n(=1, 2, . . . , N) denotes a Tx antenna index, and s(n) denotes a circular shift value applied to a code of an n-th Tx antenna. The circular shift value is a value shifted in a time axis or a frequency axis with respect to a $1^{st}$ Tx antenna. Assume that groups of subcarriers to which respective codes C(n, s(n)) are mapped are denoted by g1, g2, . . . , gN. Then, each group may be configured with physically contiguous subcarriers (i.e., FSTD based on localized resource allocation) and may be configured with subcarriers distributed across a full band (i.e., FSTD based on distributed resource allocation).

If N denotes the number of Tx antennas in the FSTD mode, N subcarrier groups are allocated to the respective Tx antennas. If it is assumed that a code to be used is predetermined for each Tx antenna, a mapping vector P for mapping the C(n, s(n)) defined in the above description to the N subcarrier groups can be defined. For example, if N=2, there are two subcarrier groups g1 and g2, and there are also two codes C(1, s(1)) and C(2, s(2)). Herein, an order of codes used in each Tx antenna is fixed. The number of cases of mapping subcarrier groups to two codes is 2 as shown in the following table.

TABLE 3

| Mapping vector | C(1, s(1)) | C(2, s(2)) |
|---|---|---|
| $P_1$ | g1 | g2 |
| $P_2$ | g2 | g1 |

That is, the number of mapping vectors is 2!=2. Therefore, if the number of Tx antennas is N, the total number of mapping vectors is N!, and N! additional pieces of control information can be coupled to the synchronization signal. The following table shows a relation of mapping the N! pieces of control information to the mapping vectors.

TABLE 4

| Mapping vector P for C(1, s(1)), . . . , C(N, s(N)) | Information coupled to synchronization signal |
|---|---|
| $P_1$ = [g1, g2, . . . g(N − 1), gN] | Information 1 |
| $P_2$ = [gN, g1, . . . g(N − 2), g(N − 1)] | Information 2 |
| . . . | . . . |
| $P_{N!}$ = [g2, g3, . . . gN, g1] | Information N! |

The control signal coupler 130 determines a mapping vector $P_j$ corresponding to control information j to be coupled to the synchronization signal (where 1≤j≤N!), and controls the transmission processor 120 such that the subcarrier groups are respectively allocated to the Tx antennas according to a specific order by using the mapping vector $P_j$.

There is no restriction on a method of creating the mapping vector P as long as the respective pieces of control information are configured differently. The greater the number of defined mapping vectors, the greater the number of hypothesis tests to be performed when the UE obtains information through the synchronization signal. Therefore, the number of defined mapping vectors is preferably set to a minimum value exceeding the number of pieces of necessary control information. In addition, when distinguishing the pieces of control information, a cross-correlation difference is preferably set to its maximum so that not many errors occur in the distinguishing of the control information.

The circular shift-based coupling method and the mapping relation-based coupling method are differentiated as follows. The circular shift-based coupling method defines a shift vector S which is a combination of possible circular shifts with respect to a predetermined frequency division resource, and transmits additional control information based on the shift vector S. On the other hand, the mapping relation-based coupling method defines a mapping vector for mapping a pre-divided frequency resource with respect to one code sequence determined by using a specific circular shift, and transmits additional control information. Therefore, the circular shift-based coupling method can transmit more than N! pieces of control information by performing mapping on divided frequency resources based on various mapping vectors. However, the circular shift-based coupling method increases detection complexity of additional control information, and generates ambiguity for a circular shift size and resource mapping, which may have an effect on detection capability of the synchronization signal. Therefore, there is a need to determine a minimum and optimum mapping relation for coupling the necessary additional control information to the synchronization signal.

3. Subcarrier Index-Based Coupling Method

In order for a synchronization signal to have a structure of being repeated twice in a time axis, the synchronization signal needs to be transmitted by being carried only on an odd or even subcarrier in a frequency axis. In case of transmitting the synchronization signal by being carried on only the even subcarrier, a synchronization signal having the same amplitude and phase in one OFDM symbol is repeated twice in the time axis. On the other hand, in case of transmitting the synchronization signal by being carried only on the odd subcarrier, a synchronization signal having the same magnitude and a reverse phase in one OFDM symbol is repeated twice in the time axis. Two types of information can be easily distinguished when receiving the synchronization signal according to whether the subcarrier used in transmission is the even subcarrier or the odd subcarrier irrespective of a Tx antenna in the FSTD mode.

By using such a characteristic, two additional pieces of control information can be coupled to the synchronization signal as shown in Table 5 below.

TABLE 5

| Subcarrier index | Control information coupled to synchronization signal |
|---|---|
| Even subcarrier | Control information 1 |
| Odd subcarrier | Control information 2 |

The control signal coupler 130 determines an index of a subcarrier corresponding to control information to be coupled to the synchronization signal, and controls the transmission processor 120 such that the synchronization signal is mapped to subcarriers based on the subcarrier index. In this manner, the control information can be coupled to the synchronization signal, and the UE can distinguish the control information coupled to the synchronization signal from a repetitive pattern of the synchronization signal in the time axis.

By using any one of the circular shift-based coupling method, the mapping relation-based coupling method, and the subcarrier index-based coupling method or by using a combination of them, the synchronization signal can be coupled with the aforementioned additional control information (i.e., frame boundary information, CP information, the number of Tx antennas, FRF information, support information of heterogeneous or legacy wireless communication systems, frequency bandwidth information, femto/relay cell information, carrier ID information, etc.). Upon receiving the synchronization signal, the UE can obtain desired control information in the synchronization signal acquisition process without decoding of additional control information.

Since the coupling methods are not influenced by each other, a method of coupling the additional control information to the synchronization signal in a format of a mapping table created by combining the three methods above may also be included.

Figure 9:
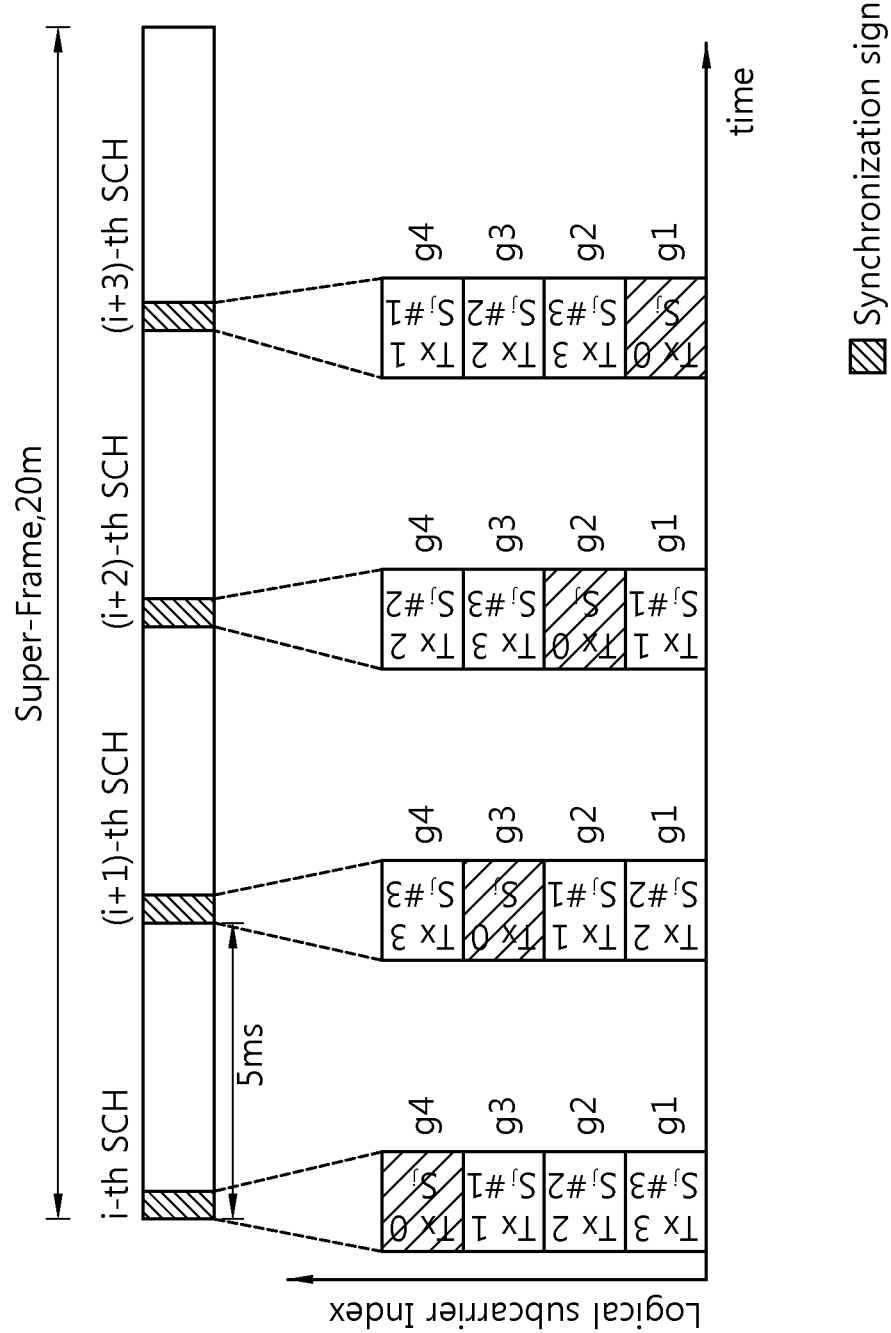
FIG. 9 is a diagram for explaining a method of transmitting a synchronization signal according to an embodiment of the present invention.

FIG. 9 is a diagram for explaining a method of transmitting a synchronization signal according to an embodiment of the present invention. In this case, frame boundary information which is additional control information is coupled to the synchronization signal according to the mapping relation-based coupling method. Herein, the number of Tx antennas is 4.

Referring to FIG. 9, one superframe includes an i-th SCH to an (i+3)-th SCH. A frame boundary is differentiated by each SCH. The synchronization signal transmitted on each SCH is coupled with the frame boundary information. A UE can even know that at which frame the synchronization signal is received by the UE. The frame boundary information is coupled by using the mapping relation-based coupling method.

Subcarriers are divided into four groups g1, g2, g3, and g4. Herein, subcarriers belonging to each group may be physically contiguous in a localized manner, or may be distributed across a full band. That is, in the subcarriers belonging to each group, physical subcarrier indices are aggregated for each group and a logical index is assigned to each group. That is, when transmission is performed using FSTD, the subcarriers belonging to each group may be contiguously allocated to each Tx antenna in a localized manner, or may be allocated across a full band in a distributed manner.

In each Tx antenna, a code $S_j\#n$ is used for synchronization signal transmission. $S_j$ denotes a code used in a Tx antenna 0 (or simply Tx 0). $S_j\#n$ is a code circularly shifted by a specific size from $S_j$ in a time or frequency axis, and is used in a Tx antenna n (or simply Tx n). That is, codes $S_j$, $S_j\#1$, $S_j\#2$, and $S_j\#3$ are respectively used in Tx antennas 0 to 3 (or Tx 0 to Tx 3).

Regarding the code sequences $S_j$, $S_j\#1$, $S_j\#2$, and $S_j\#3$, if a mapping vector $P_i$ is [g4, g3, g2, g1], it indicates an i-th synchronization signal. If a mapping vector $P_{i+1}$ is [g3, g2, g1, g4], it indicates an (i+1)-th synchronization signal. If a mapping vector $P_{i+2}$ is [g2, g1, g4, g3], it indicates an (i+2)-th synchronization signal. If a mapping vector $P_{i+3}$ is [g1, g4, g3, g2], it indicates an (i+3)-th synchronization signal.

If the UE receives a synchronization signal corresponding to the mapping vector $P_{i+2}$, the UE can know that the UE has received a synchronization signal of an (i+2)-th frame.

As such, a BS transmits every synchronization signal by changing a mapping vector used in each Tx antenna, and there is no restriction on a method of changing the mapping vector. However, the mapping vector has to be different between four synchronization signals in the same superframe. Although it is shown in FIG. 9 that only 4 Tx antennas are used for example, the present invention can also apply to a case where 4 or more (or less) Tx antennas are used.

Figure 10:
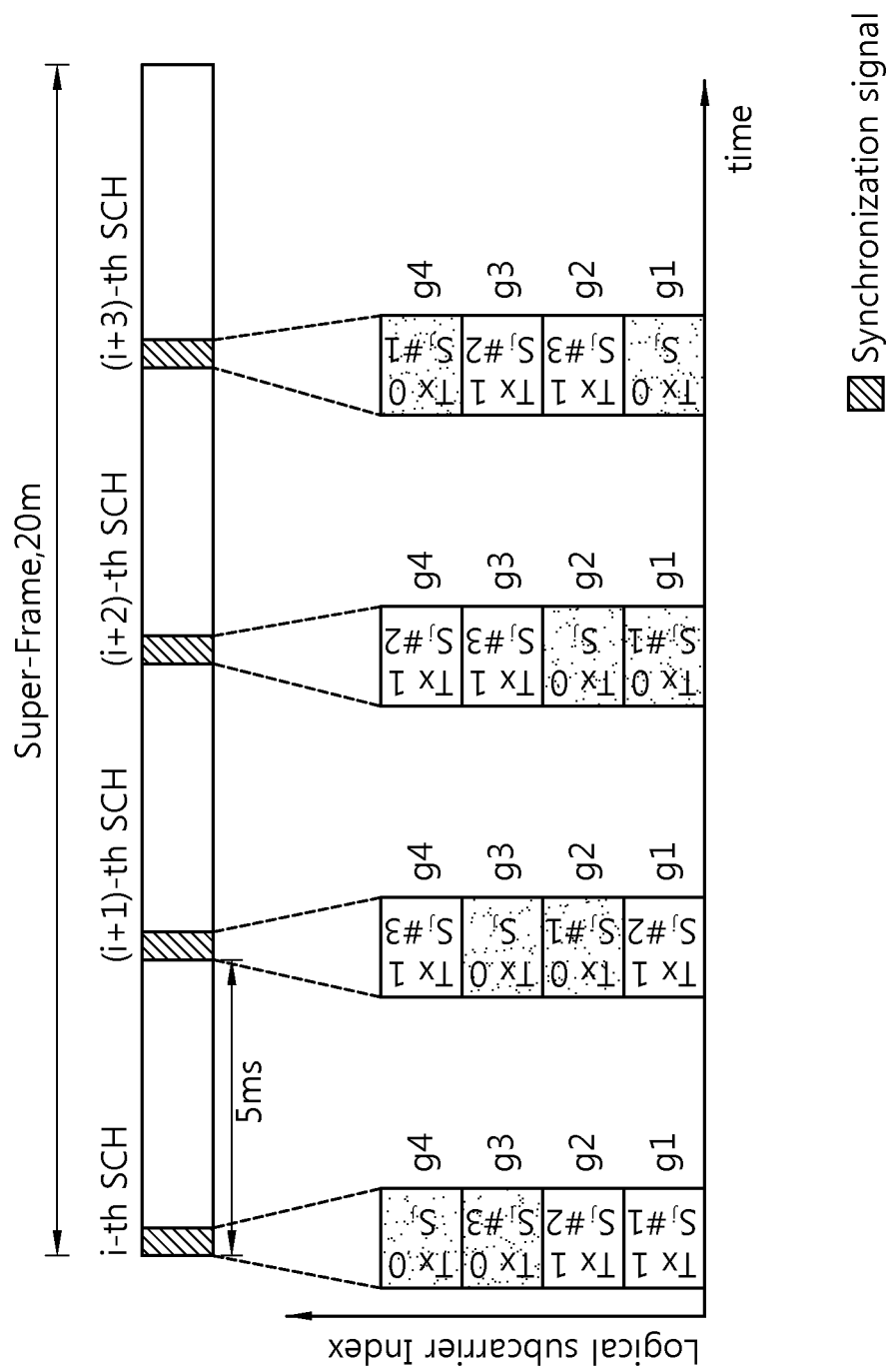
FIG. 10 is a diagram for explaining a method of transmitting a synchronization signal according to another embodiment of the present invention.

FIG. 10 is a diagram for explaining a method of transmitting a synchronization signal according to another embodiment of the present invention. In this case, frame boundary information which is additional control information is coupled to the synchronization signal according to the mapping relation-based coupling method. Herein, the number of Tx antennas is 2.

Referring to FIG. 10, even if the number of Tx antennas is 2, there are four subcarrier groups g1, g2, g3, and g4 according to FSTD. In addition, codes $S_j$ and $S_j\#1$ are used in a Tx antenna 0 (or Tx 0), and $S_j\#2$ and $S_j\#3$ are used in a Tx antenna 1 (or Tx 1). When having two Tx antennas, the possible number of mapping vectors is 2!=2. Therefore, when a synchronization signal is transmitted with a period of 5 ms, only up to two pieces of frame boundary information can be coupled to the synchronization signal.

In order to increase the number of pieces of frame boundary information coupled to the synchronization signal, two subcarrier groups are allocated to one Tx antenna while maintaining the number of FSTD-based subcarrier groups to 4, and thus four types of mapping relations can be created in total as shown in FIG. 9. That is, regarding code sequences $S_j$, $S_j\#1$, $S_j\#2$, and $S_j\#3$, if a mapping vector $P_i$ is [g4, g3, g2, g1], it may indicate an i-th synchronization signal. If a mapping vector $P_{i+1}$ is [g3, g2, g1, g4], it may indicate an (i+1)-th synchronization signal.

Herein, a code used in each subcarrier group may be created as shown in FIG. 9, or it may also be considered that $S_j$ and $S_j\#1$ are concatenated to one long concatenated code, and $S_j\#2$ and $S_j\#3$ are concatenated to another long concatenated code. Of course, a relation of the two concatenated codes may satisfy a circular shift relation in a time axis or a frequency axis. When using such a concatenated code, a code used in transmission of one Tx antenna is doubled, and thus a correlation property between codes may be further improved.

Figure 11:
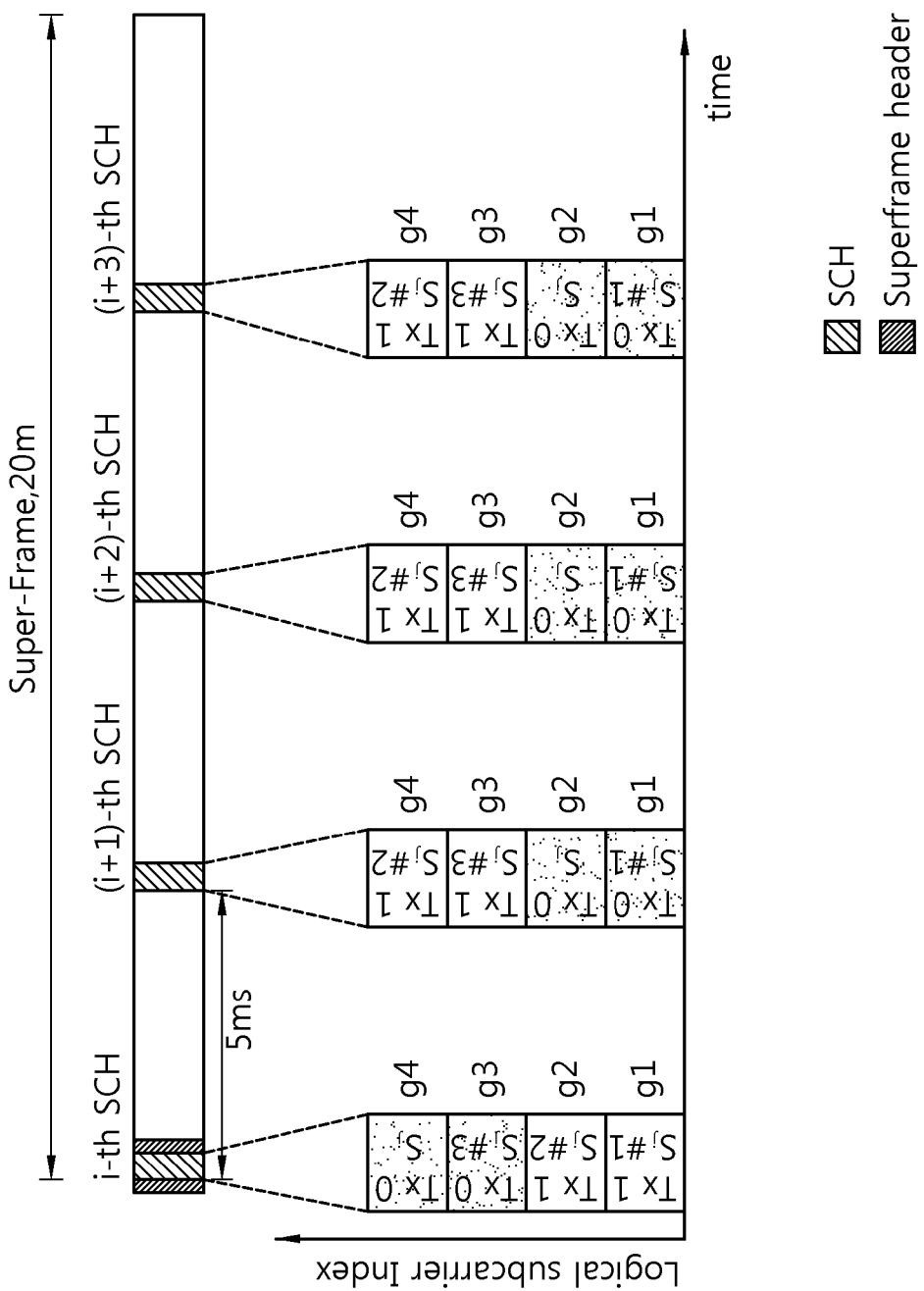
FIG. 11 is a diagram for explaining a method of transmitting a synchronization signal according to another embodiment of the present invention.

FIG. 11 is a diagram for explaining a method of transmitting a synchronization signal according to another embodiment of the present invention. In this case, frame boundary information which is additional control information is coupled to the synchronization signal according to the mapping relation-based a coupling method. Herein, the number of Tx antennas is 2.

Referring to FIG. 11, an i-th SCH corresponds to a frame including a superframe header, and the remaining SHCs correspond to frames not including the superframe header. It can be seen that the frame including the superframe header is a boundary of the superframe. Therefore, a signature of a superframe boundary is coupled to an i-th synchronization signal, and is not coupled to the remaining synchronization signals. Control information indicating that the frame is the superframe boundary is mapped to a mapping vector [g1, g2, g3, g4], and control information indicating that the frame is not the superframe boundary is mapped to the remaining mapping vectors other than the mapping vector [g1, g2, g3, g4].

Figure 12:
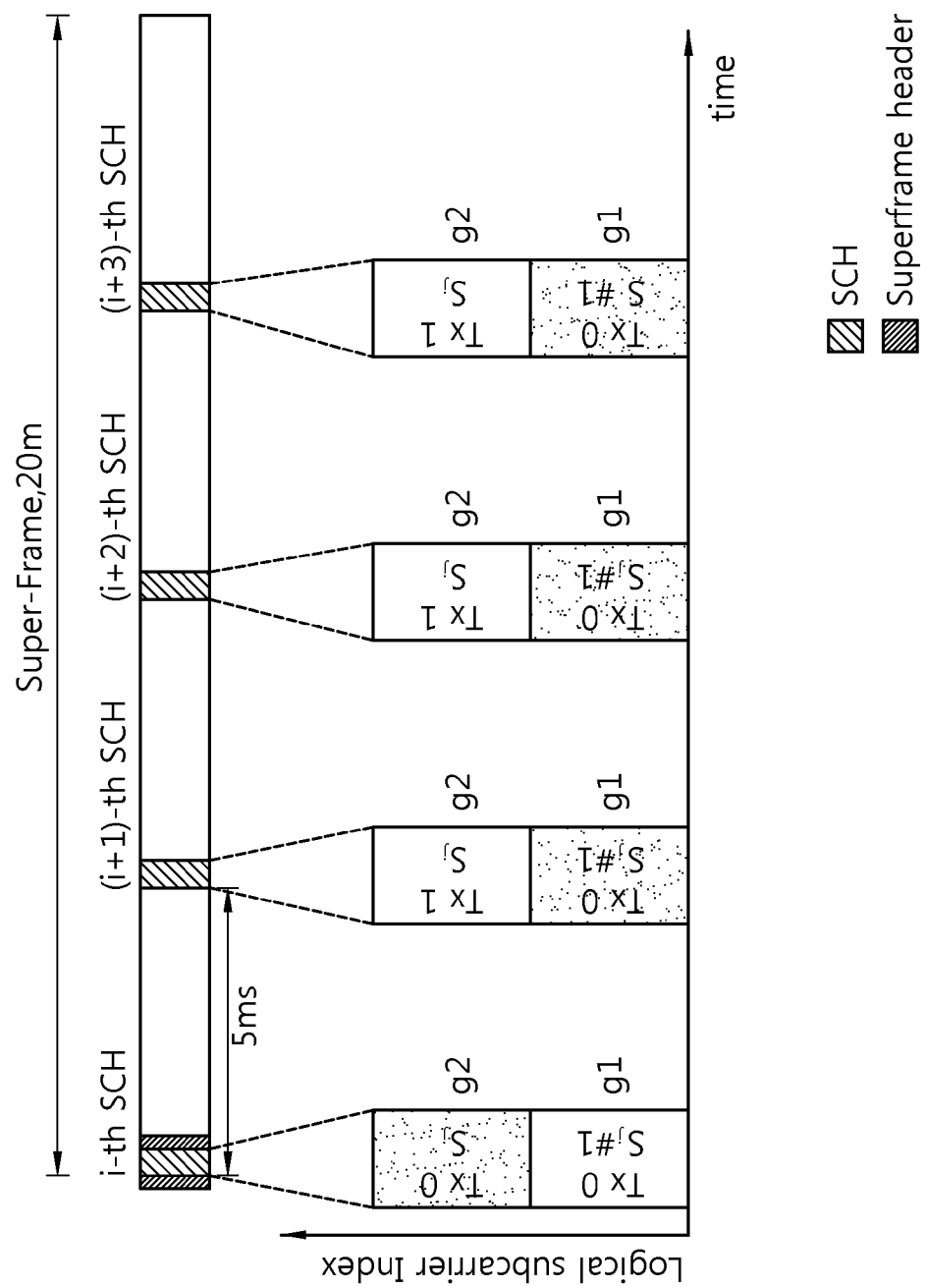
FIG. 12 is a diagram for explaining a method of transmitting a synchronization signal according to anther embodiment of the present invention.

FIG. 12 is a diagram for explaining a method of transmitting a synchronization signal according to anther embodiment of the present invention. In this case, frame boundary information which is additional control information is coupled to the synchronization signal by the mapping relation-based coupling method. Herein, the number of Tx antennas is 2.

Referring to FIG. 12, two subcarrier groups are used to couple a signature to a synchronization signal unlike in FIG. 11. If it is regarded that information on a superframe boundary exists only for two cases, i.e., when it is a boundary or when it is not a boundary, then the information on the superframe boundary can be coupled to the synchronization signal by using only two subcarrier groups without having to distinguish two or more subcarrier groups. Regarding code sequences $S_j$ and $S_j\#1$, if a mapping vector is [g1, g2], it is a synchronization signal indicating a superframe boundary, and if the mapping vector is [g2, g1], it is a synchronization signal not indicating the superframe boundary.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for transmitting a synchronization signal using a plurality of transmit (Tx) antennas, the apparatus comprising:
    a synchronization signal generator for generating a first synchronization signal shifted based on a first shift code and generating a second synchronization signal shifted based on a second shift code;
    a transmission processor for allocating different subcarriers to a first Tx antenna and a second Tx antenna without overlapping, mapping the first synchronization signal to the first Tx antenna and the second synchronization signal to the second Tx antenna, and generating an orthogonal frequency division multiplexing (OFDM) symbol by performing inverse fast Fourier transformation (IFFT);
    a control signal coupler for determining the first shift code and the second shift code based on frame boundary information of a frame; and
    a radio frequency (RF) unit for transmitting the first synchronization signal via the first Tx antenna to a user equipment (UE) and transmitting the second synchronization signal via the second Tx antenna to the UE,
    wherein the frame boundary information is an index of the frame of a 5-ms length in a super-frame of a 20-ms length determined based on the first shift code and the second shift code, the super-frame including a plurality of frames,
    wherein the control signal coupler is further configured to determine the first shift code and the second shift code based on whether the frame includes a header of the super-frame, and
    wherein the second shift code is a code shifted in a time axis or a frequency axis with respect to the first shift code.

2. The apparatus of claim 1, wherein the control signal coupler discriminates the frame boundary information by varying a combination of the first shift code and the second shift code.

3. The apparatus of claim 1, wherein the control signal coupler discriminates the frame boundary information by varying allocations of the subcarriers to the first Tx antenna and the second Tx antenna.

4. The apparatus of claim 1, wherein the transmission processor allocates even subcarriers to the first Tx antenna and allocates odd subcarriers to the second Tx antenna.

5. The apparatus of claim 1, wherein the control signal coupler classifies the subcarriers into a first group and a second group, and the transmission processor allocates the first group to the first Tx antenna and the second group to the second Tx antenna.

6. A method for transmitting a synchronization signal using a plurality of transmit (Tx) antennas, the method comprising:
    generating a first synchronization signal shifted based on a first shift code;
    generating a second synchronization signal shifted based on a second shift code;
    allocating different subcarriers to a first Tx antenna and a second Tx antenna without overlapping;
    mapping the first synchronization signal to the first Tx antenna and the second synchronization signal to the second Tx antenna;

generating an orthogonal frequency division multiplexing (OFDM) symbol by performing inverse fast Fourier transformation (IFFT);

determining the first shift code and the second shift code based on frame boundary information of a frame;

transmitting the first synchronization signal via the first Tx antenna to a user equipment (UE); and transmitting the second synchronization signal via the second Tx antenna to the UE, wherein the frame boundary information is an index of the frame of a 5-ms length in a super-frame of a 20-ms length determined based on the first shift code and the second shift code, the super-frame including a plurality of frames, wherein the first shift code and the second shift code are determined based on whether the frame includes a header of the super-frame, and wherein the second shift code is a code shifted in a time axis or a frequency axis with respect to the first shift code.

* * * * *